United States Patent
Thomas

(10) Patent No.: US 6,421,339 B1
(45) Date of Patent: Jul. 16, 2002

(54) METHODS AND SYSTEMS FOR CALL FORWARDING

(75) Inventor: Michael Flynn Thomas, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/096,657

(22) Filed: Jun. 12, 1998

(51) Int. Cl.⁷ .............................................. H04L 12/60
(52) U.S. Cl. .................... 370/352; 370/401; 379/88.17; 445/432
(58) Field of Search ................................ 370/401, 400, 370/351, 352, 462, 355, 356, 260, 486, 487, 468; 709/223, 227, 204; 455/445, 432, 433, 435, 440, 410; 379/88.7, 88.19, 88.25, 34

(56) References Cited

U.S. PATENT DOCUMENTS

| | | | | |
|---|---|---|---|---|
| 6,031,896 A | * | 2/2000 | Gardell | 379/34 |
| 6,049,531 A | * | 4/2000 | Roy | 370/260 |
| 6,064,887 A | * | 5/2000 | Kallioniemi | 455/445 |
| 6,128,304 A | * | 10/2000 | Gardell | 370/401 |
| 6,144,671 A | * | 11/2000 | Peripanathan | 370/409 |
| 6,240,449 B1 | * | 5/2001 | Nadeu | 709/223 |
| 6,256,612 B1 | * | 7/2001 | Vo | 704/500 |

FOREIGN PATENT DOCUMENTS

WO     WO97 26769     7/1997

OTHER PUBLICATIONS

Perkins C. E.; "Mobile IP" IEEE Communications Magazine, vol. 35, No. 5, May 1, 1997, pp. 84–86, 91–99 (XP 000657114).

Liao W: "Mobile Internet Telephony: mobile extensions to H. 323" Proceedings of Infocom '99: Conference on Computer Communications, vol. 1, Mar. 21–25 1999, pp. 12–19 (XP–002115435).

Thom G A: "The Multimedia Communications Standard for Local Area Networks", IEEE Communications Magazine, vol. 34, No. 12, Dec. 1, 1996, pp. 52–56 (XP000636454).

(List continued on next page.)

*Primary Examiner*—Douglas Olms
*Assistant Examiner*—Ricardo M. Pizarro
(74) *Attorney, Agent, or Firm*—Carr Law Firm, L.L.P.

(57) ABSTRACT

Disclosed is an method and apparatus for configuring an H.323 compliant data packet network with a registering function whereby home based users are identified separate from visiting users having other networks as home bases. Thus user location data may be retrieved and/or modified as those users roam to other H.323 compliant networks and register with a gatekeeper at that visited network. The registration of a visiting user with a visited gatekeeper includes the process of assigning a transient identity to the roaming user, obtaining confirmation from the home gatekeeper that roaming is authorized and registering the roaming users present address and transient identity at the home site so that calls received at the home network can be directed to the user at the visited site.

12 Claims, 2 Drawing Sheets

OTHER PUBLICATIONS

ETSI, TS 101 312: Telecommunications and Internet Protocol Harmonization Over Networks (Tiphon); Network Architecture and Reference Configurations; Scenario 1, Jun. 1998.

ITU–T Recommendation H.323, Packet–Based Multimedia Communications Systems, Feb. 1998.

ITU–T Recommendation H.225.0, Call Signalling Protocols and Media Stream Packetization for Packet–Based Multimedia Communication Systems, Feb. 1998.

ITU–T Recommendation H.323, Visual Telephone Systems and Equipment for Local Area Networks Which Provide a Non–Guaranteed Quality of Service, Nov. 1996.

ETSI, GSM 03.04: Digital Cellular Telecommunications System; Signalling Requirements Relating to Routeing of Calls to Mobile Subscribers, Nov., 1996.

ETSI, GSM 03.12: Digital Cellular Telecommunications System; Location Registration Procedures, Nov., 1996.

ETSI, GSM 03.02: Digital Cellular Telecommunications System (Phase 2+); *Network Architecture*, Mar. 1996.

ETSI, GSM 09.02: Digital Cellular Telecommunications System (Phase 2+); *Mobile Application Part (MAP) Specification*, Oct. 20, 1995.

* cited by examiner

METHODS AND SYSTEMS FOR CALL FORWARDING

TECHNICAL FIELD

The present invention relates in general to the internet and in particular to methods and systems for accommodating roaming endpoint users across H.323 compliant network domains.

BACKGROUND

The internet comprises an interconnected set of networks where the individual networks may use various protocols within a specific network but which use standardized internet protocols (IP) for communicating with other networks.

While the internet started with the idea of transmitting only text, the protocol has expanded to many types of media including voice, video and other graphics. The communication is in the form of packets of data and thus there is no solid or fixed connection as is the case with the public switched telephone network system (PSTN). In general, when an internet user wants to communicate with another user, the sending party transmits a message to the internet service provider (ISP) of the recipient. The recipient obtains the communication when he next accesses the ISP and requests any previously unreceived messages. Two way communication of either voice or text requires an advance arrangement on the part of both the sending party and the recipient to be accessing the internet and using the appropriate protocol.

In an attempt to simplify internet communication problems, various standards have been formulated and adopted in the industry. These standards are followed when designing new hardware and software. An example is H.323 entitled "PACKET BASED MULTIMEDIA COMMUNICATIONS SYSTEMS" which is incorporated herein by reference. Standard H.323 covers the technical requirements for multimedia communications systems in those situations where the underlying transport is a packet based network (PBN) which may not provide a guaranteed quality of service (QoS). The H.323 standard covers not only calls between H.323 compliant terminals in remotely located H.323 compliant networks, but also covers calls between such terminals and telephones in switched circuit systems such as the PSTN. For the purposes of this invention, a call is defined as a multimedia communication between two terminals at least one of which is H.323 compliant. The call may comprise the use of a collection of channels between terminal endpoints some of which channels may be "unreliable". In accordance with terminology in the art, a "reliable" channel uses a protocol that keeps track of the number and order of messages sent and received so that the receiving endpoint knows when data packets are missing or received out of order. An unreliable channel merely delivers message packets as well as it can but requires the sending program to worry about whether or not any messages are received at the destination and whether or not received messages are received in the proper order. As will be obvious to one skilled in the art, an unreliable channel will normally provide much faster communications of a given quantity of data than would a channel that must also continually communicate data tracking messages.

Such a call as defined herein begins with a call setup procedure and ends with a call termination procedure. Other examples of standards applicable to calls incorporating the internet are H.225.0 entitled "CALL SIGNALING PROTOCOLS AND MEDIA STREAM PACKETIZATION FOR PACKET BASED MULTIMEDIA COMMUNICATIONS SYSTEMS", H.235 entitled "SECURITY AND ENCRYPTION FOR H SERIES (H.323 AND OTHER H.245 BASED) MULTIMEDIA TERMINALS" and H.245 entitled "CONTROL PROTOCOL FOR MULTIMEDIA COMMUNICATIONS". The H.225.0, H.235 and H.245 standards are also incorporated herein by reference.

To date, the standards and the industry practice have been directed to communications between users accessing terminals at known locations in their home network. While generally, users must check the network to see if any communications are being held for the user, systems exist that notify a user that there is mail in the mailbox when a user's terminal is turned ON. Further, if the user's terminal is already turned ON, a display or a speaker of a terminal can advise the user that a communication, whether electronic mail or a voice call, is being received. The H.323 standard referenced above includes voice and other multimedia calls set up and completed between a H.323 compliant terminal and another terminal where the recipient H.323 compliant terminal user is located in that users "home" network.

Users are often required to travel to remote sites for extended periods of time and while at the remote site may have access to a terminal on a different network from that users home network. It would be desirable to have a system and method for automatically and seamlessly forwarding voice and other communications, originally directed to a users terminal at a home network, to a terminal at the remote site after a user contacts a home network and forwarding is authorized. While such an action would be comparable to roaming users in cellular phone technology, the differences in basic construction of the internet and the telephone system prevent any direct correlation in processes to accomplish such authorization and forwarding of communications.

SUMMARY OF THE INVENTION

The present invention is directed to the method of and apparatus for completing multimedia calls over a packetized data transmission link to a roaming user currently located in a network foreign to the users home network.

BRIEF DESCRIPTION OF THE DRAWINGS

For a more complete understanding of the present invention, and its advantages, reference will now made in the following Detailed Description to the accompanying drawings, in which.

DETAILED DESCRIPTION

Figure 1:
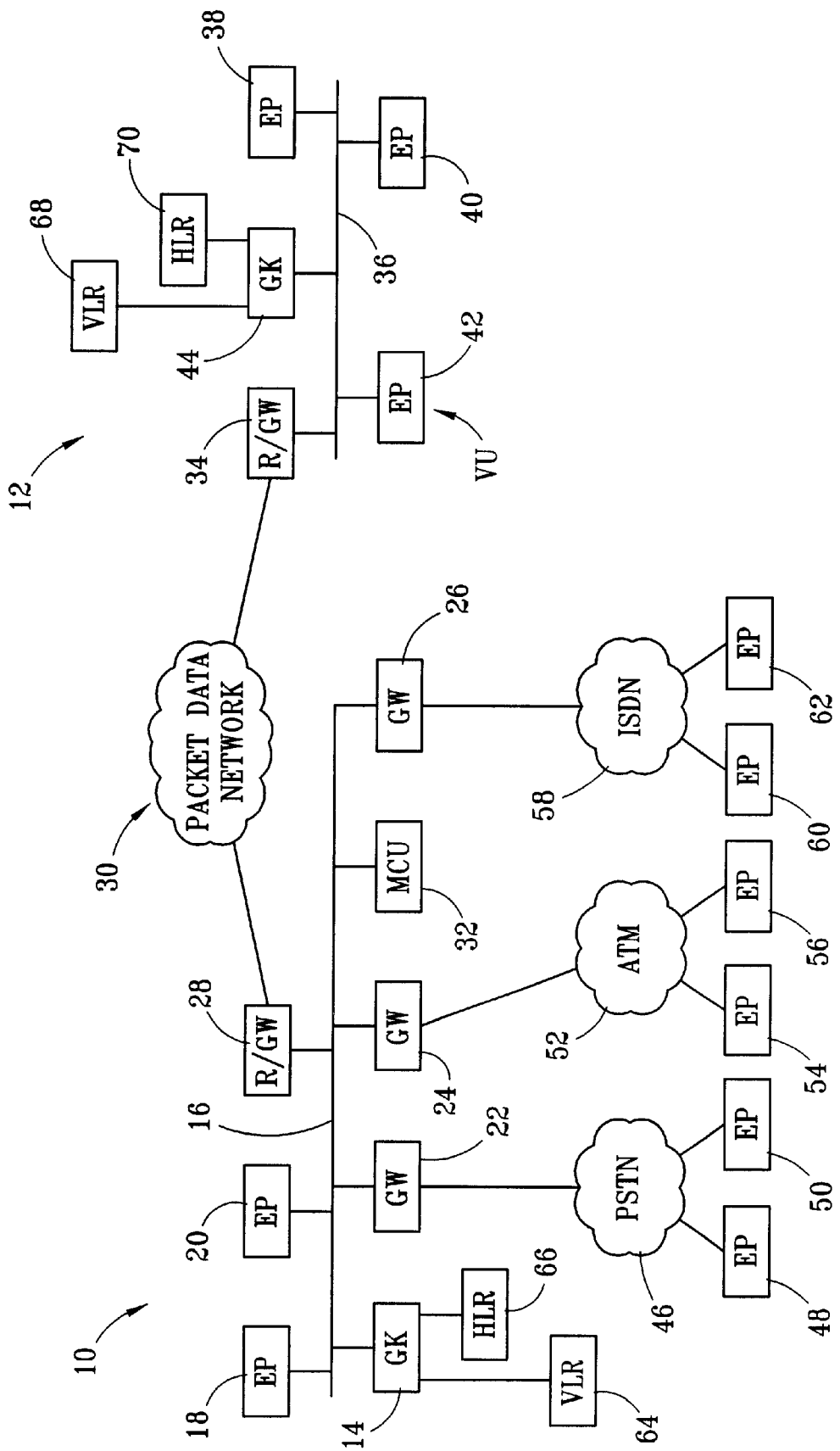
FIG. 1 is a is a general block diagram of the present invention.

In FIG. 1 the reference numeral 10 refers to a first H.323 compliant network domain while a second H.323 compliant network domain is given a designation of 12. The network domain 10 includes a gatekeeper 14 connected via a bus 16 to many other components some of which are shown. Endpoints 18 and 20 are two out of potentially many endpoint terminals connected to bus 16 the others of which are not shown. A plurality of gateways 22, 24 and 26 are also shown connected to bus 16. A block 28, which includes the functions of both a gateway and an internet protocol (IP) router (R/GW), is interconnected between bus 16 and a packet data network generally indicated as 30. The block 30 may be the Internet, an intranet or any other packet data transmission means for supplying data between domain 10 and network domain 12. The domain may also contain a multi-point control unit (MCU) such as shown for block 32.

Domain 12 includes a combination router and gateway block 34 which provides the interconnection between a bus 36 of domain 12 and the network 30. As illustrated, a plurality of endpoints 38, 40 and 42 are connected to bus 36. A gatekeeper 44 is likewise connected to bus 36. The domain 12 would also be likely to have further gateways, not shown, in a manner similar to that of domain 10.

Gateway 22 is shown connected to the public switched telecommunication network or PSTN and designated as 46 which is shown having a pair of PSTN compliant endpoint devices 48 and 50 connected thereto. Devices 48 and 50 would typically be ordinary computer telephone modems and their associated computer terminals along with required voice equipment such as speakers and a microphone. Gateway 24 is shown connected to an asynchronous transmission mode (ATM) network 52 having a pair of endpoints 54 and 56 connected thereto. Gateway 26 is connected to an ISDN network 58 and has a pair ISDN compliant endpoints 60 and 62 connected to communicate with other devices such as an endpoint within the domain 10 or PSTN 46.

The portions of FIG. 1 described thus far could be considered to represent a prior art communication system. As will be noted however gatekeeper 14 has connected thereto a visiting location register (VLR) 64 and further has a home location register (HLR) 66. The gatekeeper 44 has similar VLR and HLR boxes 68 and 70. While the VLR and HLR functions may readily be incorporated within a gatekeeper, these blocks are shown external for ease in discussing the function and operation of same. As will be realized, the gatekeeper boxes 14 and 44 further include software for providing the added functions necessary to register visiting users, assign transient identities, forward incoming communications to the last known location of a roaming endpoint user and to update storage registers 64 through 70. For the purpose of describing the operation of the invention, endpoint 42 has been further designated as VU for visiting user. The visiting user (VU) may bring that users own terminal for connection to network 12 or may use an existing terminal on the network and want to have communications, initially directed to his home network, forwarded to endpoint 42. It may be understood, for this description, that the VU has network 10 as that users home network and gatekeeper (GK) 14 as a home gatekeeper.

While FIG. 1 may typically be understood to represent a situation where network domains 10 and 12 are physically separated by a great distance, the invention is also applicable to two different zones within a single network wherein each of the zones has a different gatekeeper.

Figure 2:
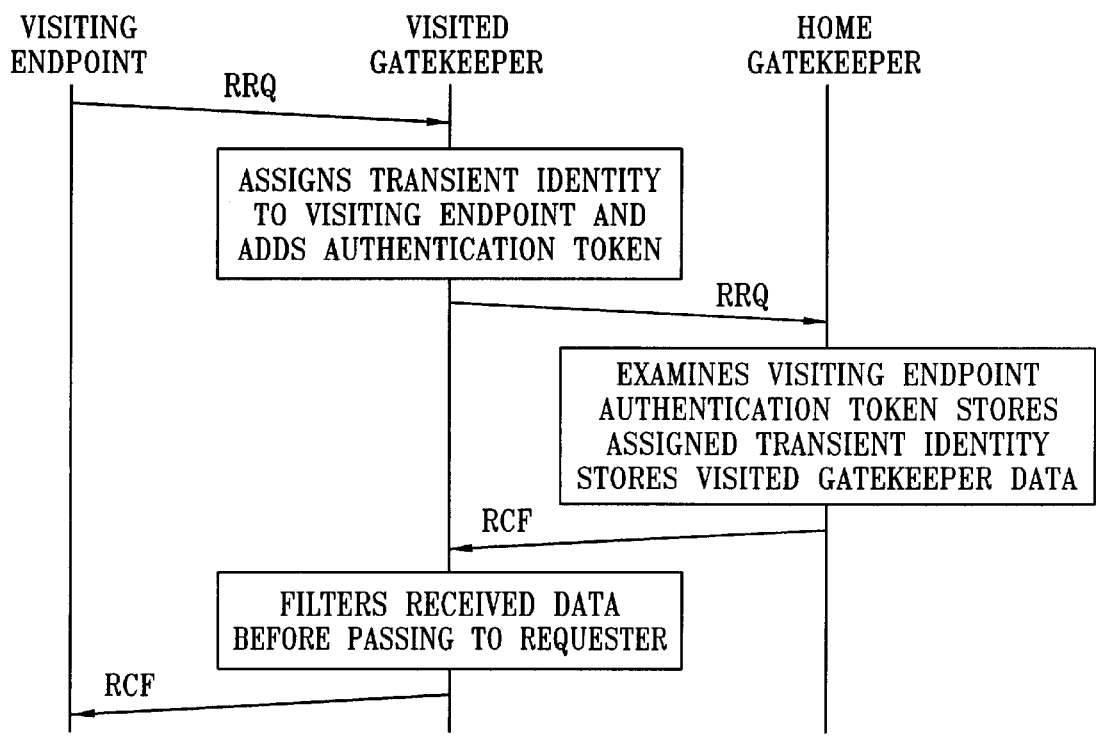
FIG. 2 illustrates, in a time sequence diagram form, a methodology of registering a visiting terminal or user in a foreign network.

The H.323 protocol mentioned above requires that an endpoint terminal, of a network, register with the gatekeeper of that network. The registration would normally occur whenever a terminal such as 42 is activated but also may be required on a periodic basis in the design of some networks. Thus, and as shown in FIG. 2, the visiting user sends a registration request to the visited gatekeeper 44 in networkB. Referring to FIG. 1, endpoint 42 would send a message to gatekeeper 44 requesting registration. This message includes the terminal alias for terminal 42, a current IP address and an VU and/or endpoint authentication token. This message would include data equivalent to "I am joe@networkA.com" and "my RAS address is 1.2.3.4:10050" and "my call signalling address is 1.2.3.4:2500". The gatekeeper 44 then assigns a transient identity, such as VU501 to visiting endpoint 42 and forwards the request along with a visited gatekeepers authentication token and the assigned transient identity to the home gatekeeper in networkA which as is shown in FIG. 1 would be gatekeeper 14. The visited gatekeeper must be able to determine the home network and/or gatekeeper from the alias information sent by the terminal 42 to the visited gatekeeper 44, otherwise the registration request could not be forwarded. One reason the registration request must be forwarded to the home gatekeeper is that the visited gatekeeper has no means for ascertaining whether or not the user operating endpoint 42 is authorized to roam to network 12. However the primary purpose for sending the registration request to the home network is to identify the visited network and the address where the home network should contact the visited network to deliver calls to the roaming user. Thus each of the gatekeepers such as 44 must maintain a listing or database register of the networks, such as networkA, that are authorized to send roaming users to networkB. Likewise, gateway 44 must keep a separate list of networks to which networkB users may be allowed to roam in the event that the associated network roaming agreements are not reciprocal.

When the home gatekeeper 14 receives the registration request, it examines the authentication token sent by endpoint 42, the presence of a roaming alias or transient identity as assigned by visited keeper 44 (and possibly the IP address of the sending entity). This examination causes the gatekeeper 14 to determine that the request is not a standard registration request and that further processing is required by gatekeeper 14. The home gatekeeper 14, upon determining that the registration request is for a user (joe) that has roamed from networkA, needs to update the gatekeepers information database by storing the assigned transient identity (VU501) and the visited gatekeeper data so that future communications can be forwarded to gatekeeper 44 in networkB. Home gatekeeper 14 uses the authentication token supplied by gatekeeper 44 to verify that the communication did actually come from the visiting network and was not forged by a "hacker" or other impersonator of another network. Once the identity of the visited network is established, additional determinations are made by gatekeeper 14, that visited networkB is an appropriate network to which user VU can roam. Home gatekeeper 14 uses the authentication token supplied by the VU for endpoint 42 in combination with the alias supplied by the roaming user to verify that the request is from a user and/or terminal endpoint registered at the home network and not from an impersonator of that user. Further, the home gatekeeper 14 may check its registers to see where the roaming user was last known to be located so that deregistration messages may be sent to the gatekeeper controlling the previously visited site.

Once the home gatekeeper 14 has completed updating its registers 64 and 66, it may return a registration confirmed (RCF) or a registration reject (RRJ) message to the visited gatekeeper. It may be assumed for the purposes of this description that the home gatekeeper 14 determines that the VU for terminal 42 is authorized to roam and thus returns the confirmation message to gatekeeper 44. The visited gatekeeper 44 may filter part of the received data before returning a confirmation message to visiting user endpoint 42.

Figure 3:
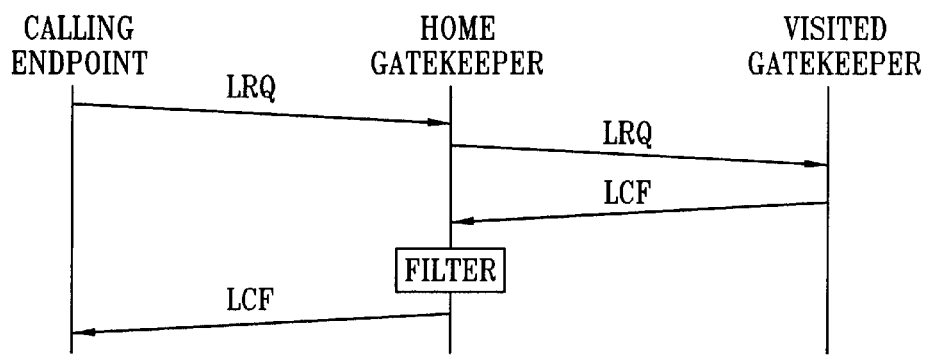
FIG. 3 illustrates, in a time sequence diagram form, a methodology of obtaining location information of a roamed party.

A calling endpoint may send an H.323 standardized location request (LRQ) message to the home gatekeeper 14 of a roaming user, as shown in FIG. 3. This message will include an alias corresponding to the roaming user (i.e. "Joe"). The GK 14 will check the HLR 66 and retrieve that transient identity or roaming alias assigned by the visited GK 44 for that roaming user. A new LRQ message will then be sent from GK 14 to visited GK 44. The visited GK 44 will check that terminal's VLR 68 to determine if VU501 still refers to Joe at EP 42 and that Joe still has a current registration. If the registration is not current, a location reject (LRJ) message may be returned from GK 44. If the LRQ received by GK 14 is malformed or otherwise improper, the LRQ might not even be forwarded to GK 44. In this instance, the GK 14 would just return a LRJ to the calling endpoint.

It is assumed in this FIGURE however that the visiting user at EP 42 is still in good standing. In this situation, appropriate address information such as a call signaling transport address and any appropriate aliases are returned from GK 44 to GK 14. GK 14 may screen or otherwise filter the data received in the LCF message from GK 44 and then send a LCF to the requester or calling endpoint. As will be obvious to network designers, the data returned to the calling party may be limited so that calls must be routed through the home gatekeeper rather than giving the calling endpoint enough data to place a call directly to a roaming user. Such routing may be maintained by the network for any of many reasons. One reason for routing all calls through the GK is that, by design, the gatekeeper is required to monitor the contents of all calls received by given users.

Figure 4:
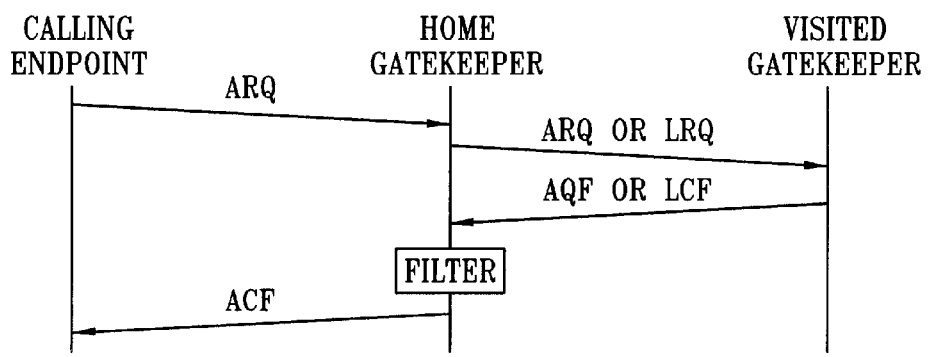
FIG. 4 illustrates, in a time sequence diagram form, a methodology of communicating an admission request as an initial step in contacting a roamed party.

Another H.323 standardized message received by gatekeepers is an admission request (ARQ) as shown in FIG. 4. As occurred in FIG. 3, the request would contain an alias such as Joe@networkA. This would correspond to the roaming user at EP 42. GK 14 would check its database and obtain the corresponding roaming alias VU501 from HLR 66. GK 14 would forward a request to GK 44 using the stored roaming alias or transient identity assigned by GK 44. This request from GK14 to GK44 would normally be an LRQ although certain circumstances occur, and as set forth in H.323, where it would be appropriate to send an ARQ.

An H.323 endpoint sends an ARQ message to its gatekeeper before placing or receiving a call in order to receive permission from the gatekeeper to use the network, to receive information regarding where signaling should be established and to obtain other useful information used in establishing communication with the other endpoint (such as: aliases, lists of gateways to use, authentication tokens to pass through network gateways, and so forth). In the present case, an H.323 endpoint inside the home network domain may wish to call a user who happens to be served by the home network and the user is roaming. In this instance, the calling endpoint is interested in obtaining the address where it should send call signaling to ultimately reach the roaming user, and the permission aspects are not pertinent.

The visited GK 44 would return an address in the appropriate ACF or LCF confirmation message as to the appropriate port address where the call signalling should be established to communicate with the roaming user VU at EP 42. The home GK 14 screens the address information and returns location information to the requestor when all signals are valid. As before, an LRJ or admission reject (ARJ) may be returned from GK 14 to the requester if the terminal 42 is not presently registered or there is some other error.

As will be apparent, the ARQ or LRQ messages for the roaming user at EP 42 could be received from a calling party within home network 10, from the visited network 12 or from non-H.323 compliant EPs such as a terminal connected to block 60 which is an ISDN compliant endpoint.

As known to those skilled in the art, the entire procedure is completely detailed in the referenced H.323 specification for initiating a voice (or other multimedia) call including setup, obtaining the connection, and releasing the connection after completion of the call. The remaining steps will be obvious to anyone familiar with this specification and the implementation will also be obvious based on the signal flow shown in FIGS. 2 through 4. The only requirement is that the data packets coming into the home network for the roaming user be directed to the visited network for delivery to the actual roaming user. As will be apparent, the home network must be contacted first and then contact be made with the visited network for instructions on where to direct packets to the visited network.

In summary, this invention allows a H.323 compliant user to roam to another H.323 compliant network that is recognized by that users home gatekeeper. After arriving at the visited network, the roaming user registers with a visited gatekeeper. The visited gatekeeper authorizes the registration by determining the network of the roaming user and that a roaming agreement exists between the visited and home network. This is accomplished by contacting the home gatekeeper which in turn authorizes the request as being from a authenticated network with which it allows roaming, that the roaming user is allowed to roam, and that the requestor is the actual user and not an impostor (an authenticated user). Once the authorization is returned, the roaming user may start to receive H.323 calls, as directed by the coordination of the home and visited gatekeeper. Since the interaction between gatekeeper and the forwarding of data packets is transparent to the caller, the caller need not even know that the user has roamed to a different network domain. As will be apparent from the above, the calling party need not be part of an H.323 compliant network but only need to have the capability to call to a H.323 compliant network.

Further functions of the system may include advising previously visited gatekeepers that a user has again roamed when a home gatekeeper detects a previous roaming status at the time a RRQ is received from a presently visited gatekeeper. Such advisory messages are not needed in systems where the time increment between required re-registrations is relatively short.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It is therefore, contemplated that the claims will cover any such modifications or embodiments that fall within the true scope and spirit of the invention.

What is claimed is:

1. A method for establishing a user in a foreign network comprising the steps of:

sending a user registration request to a visited gatekeeper, wherein the user registration request includes at least one of a terminal alias and an authentication token;

forwarding registration request data from the visited gatekeeper to a gatekeeper in a home network for authentication by said home network, wherein the registration request data forwarded by said visited gatekeeper includes at least one of a visited gatekeeper authentication token and a roaming alias; and returning a registration confirmation message from said home network to the user that requested registration in the foreign network, wherein the registration confirm message is passed through said visited gatekeeper before being received by the user requesting registration.

2. Apparatus for establishing a user in a foreign data packet network comprising:

home gatekeeper means comprising a part of a home network domain;

visited gatekeeper means;

packet data transmission means interconnecting said home gatekeeper means and said visited gatekeeper means;

terminal means logically connected to said gatekeeper means;

means for sending a visiting user registration request to said visited gatekeeper means including at least a current internet protocol (IP) address and data sufficient to identify the visiting user and that visiting users home network domain;

means for forwarding registration request data from said visited gatekeeper means to said home network domain for authentication by said home gatekeeper means; and means for returning a registration confirm message from said home gatekeeper means to the user that requested registration in the foreign data packet network.

3. A method of directing communications to users roaming between gatekeeper managed networks interconnected by packetized data networks comprising the steps of:

maintaining a list of visiting users that have requested registration in a given visited network;

supplying data from a home network, in response to a request, authorizing a visited network to forward incoming communications to a visiting user;

storing data in the home network relative to the most recently known visited location of a roaming user; and forwarding communications, initially directed to a home network address, to the most recently known visited location.

4. Communication apparatus comprising:

local and foreign domain network means;

packetized data communication means interconnecting said local and foreign domain network means;

means for registering each network users current location;

means for assigning home identities to a user that identify a users home domain network;

means for assigning transient identities to a roaming user; and means for setting up calls between said local and foreign domain network means.

5. Apparatus as claimed in claim 4 comprising in addition:

means for authenticating a roaming user currently located in a foreign network as being a user registered in a local home network that is authorized to roam.

6. A method for establishing a user in a foreign network comprising the steps of:

sending a user registration request to a visited gatekeeper, wherein the user registration request includes at least one of a terminal alias and an authentication token;

forwarding registration request data from the visited gatekeeper to a gatekeeper in a home network for authentication by said home network; and returning a registration confirmation message from said home network to the user that requested registration in the foreign network.

7. A method for establishing a user in a foreign network comprising the steps of:

sending a user registration request to a visited gatekeeper;

forwarding registration request data from the visited gatekeeper to a gatekeeper in a home network for authentication by said home network, wherein the registration request data forwarded by said visited gatekeeper includes at least one of a visited gatekeeper authentication token and a roaming alias; and returning a registration confirmation message from said home network to the user that requested registration in the foreign network.

8. A method for establishing a user in a foreign network comprising the steps of:

sending a user registration request to a visited gatekeeper;

forwarding registration request data from the visited gatekeeper to a gatekeeper in a home network for authentication by said home network; and returning a registration confirmation message from said home network to the user that requested registration in the foreign network, wherein the registration confirm message is passed through said visited gatekeeper before being received by the user requesting registration.

9. The method of claim 1, comprising the additional step of:

including, in the user registration request, at least a current internet protocol (IP) address and data sufficient to identify the user and said home network.

10. The method of claim 1, comprising the additional step of:

updating stored data accessed by said home network as to a transient identity of the user requesting registration.

11. The method of claim 1, comprising the additional step of:

updating a "roamed" databank with a gatekeeper contact for the user requesting registration.

12. The method of claim 1, comprising the additional steps of:

updating a roamed databank with a gatekeeper contact for the user requesting registration; and notifying any previously visited gatekeeper listed in the roamed databank for the user to deregister said user.

* * * * *